Sept. 26, 1950          R. Y. BARKLEY          2,523,937

LUBRICANT SYSTEM OF CONTROL FOR AUTOMOBILE ENGINES

Filed Aug. 17, 1948          2 Sheets—Sheet 1

Inventor
ROBERT Y. BARKLEY

By Mason, Fenwick & Lawrence
Attorneys

Sept. 26, 1950            R. Y. BARKLEY            2,523,937
LUBRICANT SYSTEM OF CONTROL FOR AUTOMOBILE ENGINES
Filed Aug. 17, 1948            2 Sheets-Sheet 2
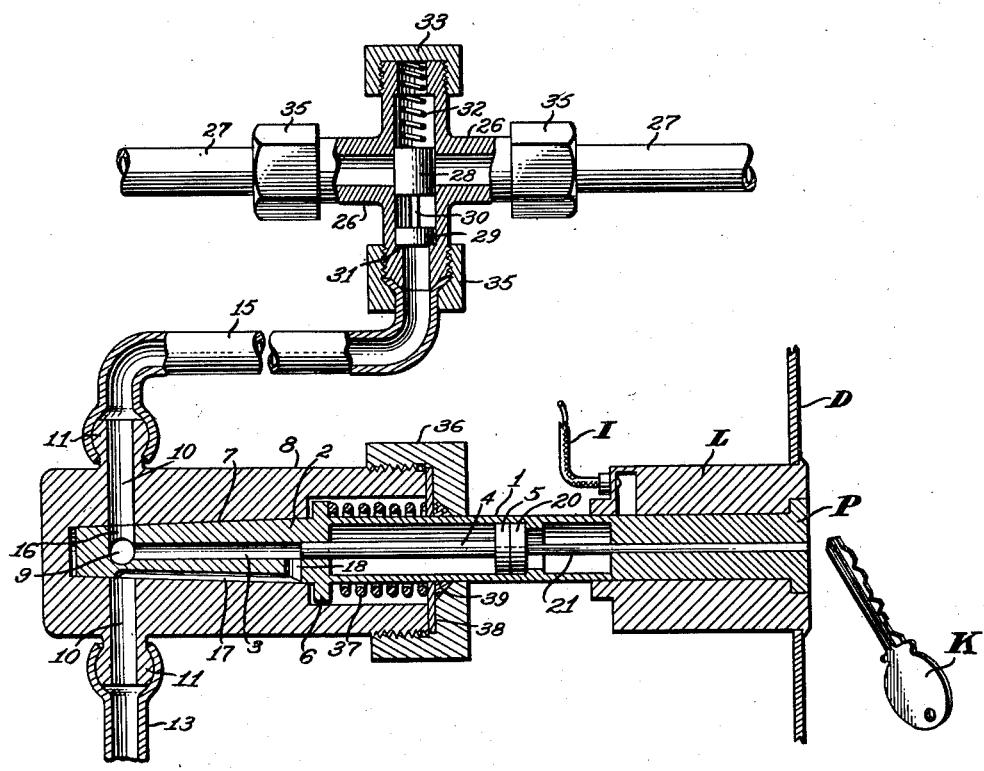
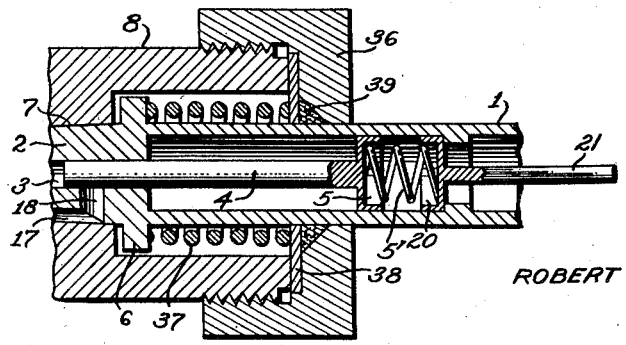
Inventor
ROBERT Y. BARKLEY
By Mason, Fenwick & Lawrence
Attorneys Patented Sept. 26, 1950

2,523,937

UNITED STATES PATENT OFFICE 2,523,937

LUBRICANT SYSTEM OF CONTROL FOR AUTOMOBILE ENGINES

Robert Y. Barkley, Weems, Va.

Application August 17, 1948, Serial No. 44,703

1 Claim. (Cl. 123—198)

This invention relates to an improved locking and safety device for automobiles, and more particularly to a locking and safety device operated by fluid pressure furnished by the conventional pressure lubricating system of the engine.

An object of the invention is to associate the pressure lubricating system of an automobile engine with the conventional ignition switch and with a pressure operated valve interposed in the fuel supply conduit to the engine so that when locked not only will the ignition be disconnected, but the valve in the fuel supply conduit will be closed, thereby preventing the starting of the engine even though the ignition wires be transposed.

A further object of the invention is to provide a device associated with the conventional ignition switch lock of an automobile, utilizing the pressure of the lubricating system, which will provide throughout the operation of the engine a correlation between the pressure lubricating system and the fuel supply, whereby any failure of pressure in the lubricating system will automatically stop the flow of fuel to the engine, thus preventing the damaging of the engine by operation with inadequate lubrication.

A further object of the invention is to provide means associating a conventional switch lock with key ejecting means operated by pressure supplied from the lubricating system of the engine which will automatically eject the lock operating key when turned to its "off" switch position.

Other objects will more particularly appear in the course of the following detailed description.

The invention consists in the novel construction, arrangement and combinations of parts hereinafter more particularly described and claimed.

Two sheets of drawings accompany this specification as part thereof, in which like reference characters indicate like parts throughout.

In the drawings:

Figure 3 is a view similar to Figure 1, but showing the lock in "off" switch position with the lock operating key ejected and the other parts in corresponding position; and Figure 4 is a fragmentary view similar to Figure 3, but shown immediately after ejection of the key.

Figure 1:
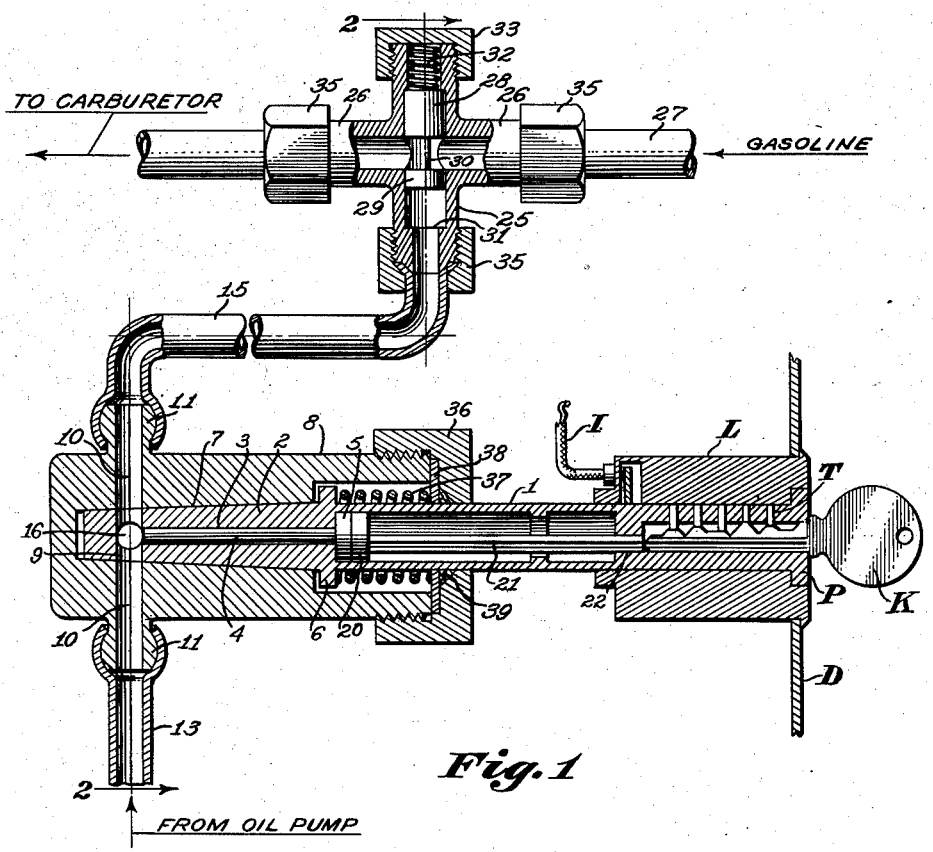
Figure 1 is a diagrammatic representation of the present invention shown partly in cross section to disclose the operative parts with the lock operating key and other parts shown in the "on" or operative switch position.
Figure 2:
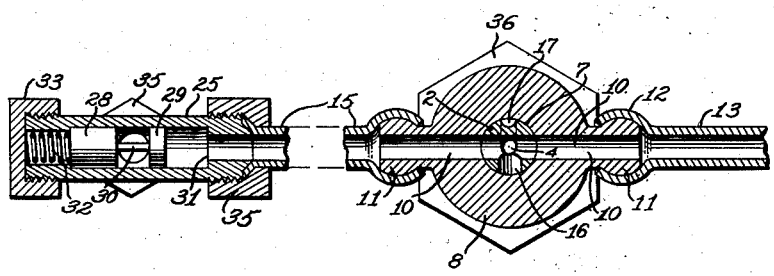
Figure 2 is a cross sectional view taken on line 2—2 of Figure 1.

Referring to the drawings which are largely diagrammatic for the purpose of illustrating the application of the present invention to an automobile engine, the engine and other parts of the car except a small portion of the dashboard being ommitted, a conventional tumbler controlled ignition lock L is applied as usual to the dashboard D, the lock including a rotary plug member P and being associated with the ignition system by a wire I, the rotary plug member P having a suitable key slot to accommodate the operative key K which is formed to cooperate with the usual tumblers T and the like also embracing suitable mechanical means, well known in the art, for mechanically preventing the withdrawal of the key K while the rotary plug P is turned to its "on" or operative position. The lock structure thus far referred to is all conventional and in common use, and is not further illustrated.

In accordance with the present invention the rotary plug member P is formed with a rearward extension 1 projecting from the lock housing and having its far end formed as a conical valve member 2, which valve member 2 is formed with a transverse through-passage 9 adjacent its far end, which passage communicates with an axial bore 3 adapted to accommodate a piston plunger 4 herein illustrated as having an inner head 5 adapted to cooperate with a head 20 formed on a key ejector plunger 21 which extends through a suitable slot 22 formed in the rotary plug P in alignment with the key slot, whereby the key K upon reciprocation of the ejector plunger 21 may be ejected from the lock. Interposed between the heads 5 and 20 is a compression spring 5' adapted to hold said heads sufficiently apart to cause piston 4 to close bleeder vent 18. The valve member 2 is further formed with a radially directed passage 16 extending from its periphery to communicate with the through transverse passage 9 and with a radially directed vent passage 18 communicating with the axial bore 3 (see Figure 3), to relieve fluid pressure from the end of piston plunger 4 at the extremity of its stroke, this radial relief passage 18 communicating with an exterior groove 17 formed in the valve member 2 and extending from the mouth of said radial passage 18 to communicate with the engine side of the lubricant conduit hereinafter described.

The conical valve member 2 is adapted to seat in a suitable conical valve seat 7 formed in a housing member 8, which housing member 8 is threaded exteriorly at its end adjacent the lock L to receive a suitably threaded cap member 36, which cap member is adapted to seat over a washer 38 between which washer and an abutment 6 formed on the valve member 2, is positioned a compression spring 37 adapted to assure the fluid-tight seating of the valve member 2 in the bore 7. Packing material 39 may be positioned in a suitable chamfered chamber formed in the head 36 to avoid any possible leakage of the lubricant from the housing 8.

The housing 8 is further formed with transverse, aligned passages 10 in alignment with the through passage 9 in the valve member 2, which transverse passages 10 extend through outwardly projecting nipple bosses 11 formed on the housing 8 to accommodate and permit the clinching thereon of the ends of conduit members 13 and 15. The conduit member 13 is a shunt pipe which extends to the lubricating system on the pump or pressure end thereof, while the conduit 15 extends to a pressure operated valve 25, the housing of which is herein illustrated as substantially of T-shape, having aligned arms 26 provided with means 35 for connecting same into the fuel supply conduit 27, these arms being provided with a through bore to form a continuation of said fuel conduit. In the oppositely disposed arms is formed a valve bore to accommodate a sliding valve 28 connected as by a narrow pin 30 with pressure head 29 adapted to be acted upon by liquid pressure supplied thereto through the conduit 15. A suitable shoulder 31 is provided in the valve housing 25 to limit the stroke of the valve member 28 and its associated pressure head 29, and a compression spring 32 is arranged to bear against the valve member 28 and a containing cap 33 so as to initially and normally bias the valve member 28 into closed position with respect to the fuel conduit. Upon application of fluid pressure to the exposed face of pressure head 29, the valve member is raised against the pressure of spring 32 to open the fuel conduit, as is illustrated in Figure 1. When the fluid pressure falls below a safe operating pressure, the compression spring 32 forces valve 28 into a position to close the fuel conduit, as is illustrated in Figure 3. This variation in the fluid pressure exerted through conduit 15 may be occasioned either by a clogging or failure of the lubricating pump or system during normal operation of the engine, in which event the engine will stop for lack of fuel before any damage can be done, or this pressure can be released by the turning of the rotary lock plug P and the valve 2 to close the passages 10 through valve housing 8, as also illustrated in Figure 3, which closing of the passages 10 excludes fluid pressure from conduit 15, while at the same time conduit 15 communicates with the axial bore 3 in valve 2 through the radial passage 16, which in the "off" position of the rotary lock plug P is directed toward the conduit 15. In this position the pressure of spring 32 forces valve 28 into closed position, shutting off the supply of fuel to the engine and at the same time forces the lubricant contained in the conduit 15 backwardly through that conduit and against the head of piston plunger 4, thereby forcing said plunger 4 from the position shown in Figure 1 to the position shown in Figure 3, compressing spring 5' and at the same time forcing the key ejecting plunger 21 to eject the key K which is possible in view of the lock construction permitting the removal of the key when the lock is in locked position. When the key is thus ejected, spring 5' returns head 5 and plunger 4 to a position where plunger 4 closes bleeder passage 18, thus blocking any fluid pressure to conduit 15 even in the event that the ignition system is surreptitiously re-established. Upon re-insertion of the key to unlock the engine, the plunger 21 is forced inwardly by the key, thereby forcing pressure plunger 4 to the left, and the parts are in position for a repeat operation.

Modifications in the particular shapes and mechanical arrangements of the various parts will readily suggest themselves to those skilled in the art, and it will be understood that the valve 8 can be connected by the conduit 13 to any suitable part of the lubricating system on the pump side of the valve, while the conduit 15 can be extended to any desirable position in the automobile or to the carburetor itself, where the fuel control valve 25 can be located. Such variations will be desirable as uniformity in the application of the device is not desirable.

Having thus fully described my invention, I claim:

In association with an automobile engine having a fuel conduit and a pressure lubricating system, a safety device comprising a pressure valve in the fuel conduit, a shunt pipe connecting the pressure valve to the conduit of the lubricating system and a lock controlled valve in said shunt pipe, said lock valve comprising a rotary key plug formed with a rotary valve extension and having a key slot including a guideway for a key ejecting plunger, a key ejecting plunger reciprocable in the guideway, said valve extension having a transverse passage and an axial bore communicating with said transverse passage, a piston in the axial bore arranged to engage and operate the key ejecting plunger, a valve housing having a bore for the rotary valve and a passage in alignment with the transverse passage in the valve member, means associating said passage with opposed portions of the shunt pipe, said rotary valve part formed with a bleeder conduit arranged to communicate the axial bore of the valve part at the end of the operative stroke of the piston to the shunt pipe and relieve the pressure against the fuel pressure valve.

ROBERT Y. BARKLEY.

REFERENCES CITED

The following references are of record in the file of this patent:

UNITED STATES PATENTS

| Number | Name | Date |
|---|---|---|
| 1,000,523 | Illsley | Aug. 15, 1911 |
| 1,473,303 | Lightford | Nov. 6, 1923 |
| 1,673,737 | DeLand | June 12, 1928 |

FOREIGN PATENTS

| Number | Country | Date |
|---|---|---|
| 697,371 | France | Jan. 16, 1931 |